(12) United States Patent
Shin

(10) Patent No.: US 11,561,511 B2
(45) Date of Patent: Jan. 24, 2023

(54) METHOD AND APPARATUS FOR GENERATING HOLOGRAM WITH WIDE VIEWING ANGLE

(71) Applicant: Electronics and Telecommunications Research Institute, Daejeon (KR)

(72) Inventor: Seunghyup Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 151 days.

(21) Appl. No.: 17/136,706

(22) Filed: Dec. 29, 2020

(65) Prior Publication Data

US 2021/0200152 A1 Jul. 1, 2021

(30) Foreign Application Priority Data

Dec. 30, 2019 (KR) .................. 10-2019-0177950

(51) Int. Cl.
*G03H 1/28* (2006.01)
*G03H 1/26* (2006.01)

(52) U.S. Cl.
CPC ............... *G03H 1/28* (2013.01); *G03H 1/265* (2013.01); *G03H 2210/30* (2013.01)

(58) Field of Classification Search
CPC ...... G03H 1/28; G03H 1/265; G03H 2210/30; G03H 1/2294; G03H 2001/0825; G03H 2001/2236; G03H 2210/36; G03H 1/0808; G03H 1/268; G03H 2001/0212
USPC .......................................................... 359/24
See application file for complete search history.

(56) References Cited

U.S. PATENT DOCUMENTS

| | | | |
|---|---|---|---|
| 7,558,421 B1 | 7/2009 | Holzbach | |
| 9,001,401 B2* | 4/2015 | Yamauchi | G03H 1/26 359/25 |
| 9,465,361 B2* | 10/2016 | Smithwick | G03H 1/0808 |
| 9,869,971 B2 | 1/2018 | Chang et al. | |
| 2015/0146269 A1 | 5/2015 | Lee et al. | |
| 2017/0153106 A1 | 6/2017 | Ozcan et al. | |
| 2018/0143588 A1* | 5/2018 | Lee | G03H 1/0808 |
| 2021/0149340 A1* | 5/2021 | Oh | G03H 1/2294 |

FOREIGN PATENT DOCUMENTS

| | | |
|---|---|---|
| JP | 2013-54068 | 3/2013 |
| WO | 2017-007432 | 1/2017 |

(Continued)

OTHER PUBLICATIONS

Edward Angel et al., "Interactive Computer Graphics: A Top-Down Approach with Shader-based OpenGL", 6th Edition, Addison-Wesley, 2012, pp. vii-xxviii.

(Continued)

*Primary Examiner* — Jade R Chwasz
(74) *Attorney, Agent, or Firm* — Kile Park Reed & Houtteman PLLC

(57) ABSTRACT

A method and apparatus for generating a hologram with a wide viewing angle is disclosed. The method includes generating a elemental complex hologram by applying oblique projection to three-dimensional (3D) information of an object based on a viewing direction, and generating a final hologram by superposing a plurality of elemental complex holograms generated based on different viewing directions.

11 Claims, 7 Drawing Sheets

(56) References Cited

FOREIGN PATENT DOCUMENTS

WO      2017-115883      7/2017
WO      2019-0163449      8/2019

OTHER PUBLICATIONS

Soheil Mehrabkani et al., "Is the Rayleigh-Sommerfeld diffraction always an exact reference for high speed diffraction algorithms?", Optics Express, Nov. 27, 2017, pp. 30229-30240, vol. 25, No. 24.
Koki Wakunami et al., "Calculation for computer generated hologram using ray-sampling plane," Optics Express, May 9, 2011, pp. 9086-9101, vol. 19, No. 10.
Hirochika Sato et al., "Real-time colour hologram generation based on ray-sampling plane with multi-GPU acceleration", Scientific Reports, published Jan. 24, 2018, 8:1500, pp. 1-10, www.nature.com/scientificreports/.
Hao Zhang et al., "Fully computed holographic stereogram based algorithm for computer-generated holograms with accurate depth cues", Optics Express, Feb. 23, 2015, pp. 3901-3913, vol. 23, No. 4.
Tomoyoshi Shimobaba et al., "Review of Fast Algorithms and Hardware Implementations on Computer Holography", IEEE Transactions on Industrial Informatics, Aug. 2016, pp. 1611-1622, vol. 12, No. 4.
Robert L. Cook, "Stochastic Sampling in Computer Graphics", ACM Transactions on Graphics, Jan. 1986, pp. 51-72, vol. 5, No. 1.

\* cited by examiner

METHOD AND APPARATUS FOR GENERATING HOLOGRAM WITH WIDE VIEWING ANGLE

CROSS-REFERENCE TO RELATED APPLICATION(S)

This application claims the priority benefit of Korean Patent Application No. 10-2019-0177950 filed on Dec. 30, 2019, in the Korean Intellectual Property Office, the disclosure of which is incorporated herein by reference for all purposes.

ACKNOWLEDGMENT

This work was supported by Institute for Information & communications Technology Promotion (IITP) grant funded by the Korea government (MSIP) (No. 2017-0-00417, Openholo library technology development for digital holographic contents and simulation).

BACKGROUND

1. Field

One or more example embodiments relate to a hologram generating method and apparatus, and more particularly, to a method and apparatus for generating a hologram that represents a wide viewing angle by combining a computer graphics (CG) pipeline and a wave optics simulation.

2. Description of Related Art

Computer-generated holography (CGH), a technology for generating a hologram by numerically simulating the travel of waves, has emerged as the performance of computers has been developed considerably. CGH is receiving a greater deal of attention due to the continuous introduction of algorithms and parallel-processing hardware that may unconstrainedly handle a virtual scene that is not easy to be represented by an existing real world-based hologram and may effectively perform a massive amount of wave travel calculations.

To numerically calculate the travel of a light wave, a physical model of diffraction of the light wave may need to be mathematically represented.

An existing hologram generating method may simulate an input light wavefield as a finite number of point light sources, and then represent the travel of a light wave using a Rayleigh-Sommerfeld diffraction (RSD) integral that superposes, at each point of a target light wavefield, a phase and an amplitude of a light wave spreading from an input point light source. The RSD integral is regarded as a building block of various CGH approaches due to its simplicity and the applicability of massive parallelization. However, it is also known to have inherent limitation when dealing with view-dependent effects including occlusion between objects and iridescent hue along surface. With increasing needs for a method of generating realistic holograms, it is desirable to develop a novel approach which solves the foregoing issues of occlusion and uneven shading.

SUMMARY

An aspect provides a method and apparatus that first generates a plurality of elemental complex holograms by applying oblique projection in different directions and synthesizes a final hologram by superposing the generated elemental complex holograms, thereby generating a digital hologram with a wide viewing angle that supports occlusion and direction-dependent shading.

Another aspect provides a method and apparatus that generates a plurality of elemental complex holograms by applying oblique projection in different directions using a rendering pipeline, thereby producing various holographic content rapidly and readily through a combination of a computer graphics (CG) rendering pipeline and a fast hologram calculation.

According to an example embodiment, there is provided a hologram generating method including generation of a elemental complex hologram by applying oblique projection to three-dimensional (3D) information of an object based on a viewing direction, and generation of a final hologram by superposing a plurality of elemental complex holograms generated based on different viewing directions.

When the number of the elemental complex holograms is less than a preset number, the hologram generating method may further include changing the viewing direction. The generation of the elemental complex hologram may be performed repeatedly until the number of the elemental complex holograms is greater than or equal to the preset number.

When there is a viewing direction for which a elemental complex hologram is not generated among preset directions, the hologram generating method may further include changing the viewing direction to the direction for which the elemental complex hologram is not generated. The generation of the elemental complex hologram may be performed repeatedly until the elemental complex hologram is generated for all the preset directions.

The elemental complex hologram may be fast generated by scanline-based hardware rendering.

The generation of the elemental complex hologram may include determining an oblique projection matrix using an orthogonal projection matrix and a shear matrix to project the 3D information of the object to a two-dimensional (2D) complex field in a rendering pipeline, and generating the elemental complex hologram by applying the determined oblique projection matrix to the 3D information of the object.

According to another example embodiment, there is provided a hologram generating apparatus including a elemental hologram generator configured to generate a elemental complex hologram by applying oblique projection to 3D information of an object based on a viewing direction, and a final hologram generator configured to generate a final hologram by superposing a plurality of elemental complex holograms generated based on different viewing directions.

When the number of the elemental complex holograms is less than a preset number, the hologram generating apparatus may further include a viewing direction controller configured to change the viewing direction. The elemental hologram generator may perform repeatedly the generation of a elemental complex hologram corresponding to each of the different viewing directions until the number of the elemental complex holograms is greater than or equal to the preset number.

When there is a direction for which a elemental complex hologram is not generated among preset directions, the hologram generating apparatus may further include a projection matrix controller configured to change the viewing direction to the direction for which the elemental complex hologram is not generated. The elemental hologram generator may perform repeatedly the generation of a elemental complex hologram corresponding to each of the different viewing directions until the elemental complex hologram is generated for all the preset directions.

The elemental complex hologram may be fast generated by scanline-based hardware rendering.

The elemental hologram generator may determine an oblique projection matrix using an orthogonal projection matrix and a shear matrix to project the 3D information of the object to a 2D complex field in a rendering pipeline, and generate the elemental complex hologram by applying the determined oblique projection matrix to the 3D information of the object.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
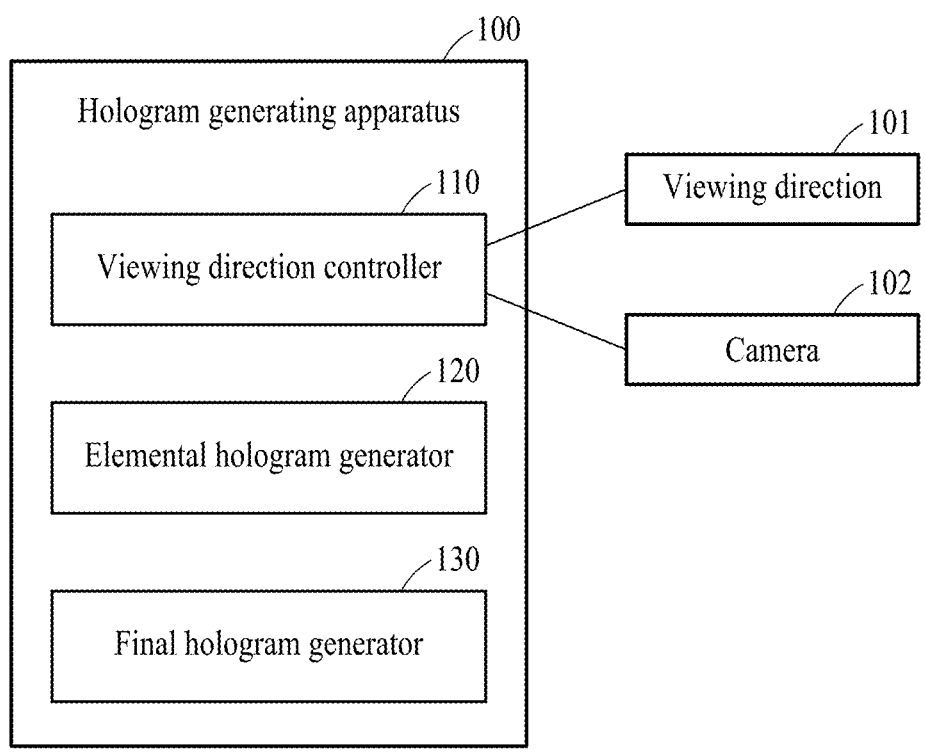
FIG. 1 is a diagram illustrating an example of a hologram generating apparatus according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating an example of a hologram generating apparatus according to an example embodiment.

Referring to FIG. 1, a hologram generating apparatus 100 includes a viewing direction controller 110, a elemental hologram generator 120, and a final hologram generator 130. The elemental hologram generator 120 and the final hologram generator 130 may be different processors, or respective modules included in a program performed in a single processor.

The viewing direction controller 110 may include an output interface for transferring a control signal to a viewing direction 101 and a camera 102, and an input interface for receiving three-dimensional (3D) information of an object from the camera 102. The viewing direction controller 110 may receive the 3D information of the object that is generated by capturing an image of the object by the camera 102, and transfer the received 3D information to the elemental hologram generator 120. In addition, The viewing direction controller 110 may transfer, to the viewing direction 101 or a control device configured to control the viewing direction 101, a control signal for changing a viewing direction 101 at the request of the elemental hologram generator 120.

The elemental hologram generator 120 may generate a elemental complex hologram by applying oblique projection to the 3D information of the object based on a direction of the viewing direction 101. For example, the elemental complex hologram may be fast generated by scanline-based hardware rendering performed by the elemental hologram generator 120. In addition, the elemental hologram generator 120 may determine an oblique projection matrix using an orthogonal projection matrix and a shear matrix to project the 3D information of the object to a two-dimensional (2D) complex field, in a rendering pipeline. The elemental hologram generator 120 may then apply the determined oblique projection matrix to the 3D information of the object to generate the elemental complex hologram.

Here, in a case in which the number of elemental complex holograms generated by the elemental hologram generator 120 is less than a preset number, the elemental hologram generator 120 may request The viewing direction controller 110 to change a viewing direction 101. In response to the request, the viewing direction controller 110 may generate a control signal to change the viewing direction 101. The elemental hologram generator 120 may repeatedly perform such an operation of generating a elemental complex hologram corresponding to each of different viewing directions 101 until the number of elemental complex holograms to be generated becomes greater than or equal to the preset number. When the preset number of elemental complex holograms is generated, the elemental hologram generator 120 may terminate the operation and transfer the generated elemental complex holograms to the final hologram generator 130.

In addition, a viewing direction 101 for which a elemental complex hologram needs to be generated may be set in advance. In such a case, the elemental hologram generator 120 may verify whether there is a direction for which a elemental complex hologram is not generated among such preset directions.

Here, in a case in which there is a direction for which a elemental complex hologram is not generated among the preset directions, the elemental hologram generator 120 may request The viewing direction controller 110 to change a direction of the viewing direction 101. In response to the request, The viewing direction controller 110 may generate a control signal to change the viewing direction 101 to the direction for which the elemental complex hologram is not generated. The elemental hologram generator 120 may repeatedly perform such an operation of generating a elemental complex hologram corresponding to each of different viewing directions 101 until respective elemental complex holograms are all generated for all the preset directions.

When the elemental complex holograms are generated for all the preset directions, the elemental hologram generator 120 may terminate the operation and transfer the generated elemental complex holograms to the final hologram generator 130.

The final hologram generator 130 may generate a final hologram by superposing the elemental complex holograms generated based on the different viewing directions 101.

According to an example embodiment, the hologram generating apparatus 100 may generate elemental complex holograms by applying oblique projection in different directions, and generate a final hologram by superposing the generated elemental complex holograms. Thus, the hologram generating apparatus 100 may generate a digital hologram with a wide viewing angle that supports occlusion and direction-dependent shading.

In addition, the hologram generating apparatus 100 may generate elemental complex holograms by applying oblique projection in different directions using a rendering pipeline. Thus, the hologram generating apparatus 100 may produce various holographic contents rapidly and readily through a combination of a computer graphics (CG) rendering pipeline and a fast hologram calculation.

Figure 2:
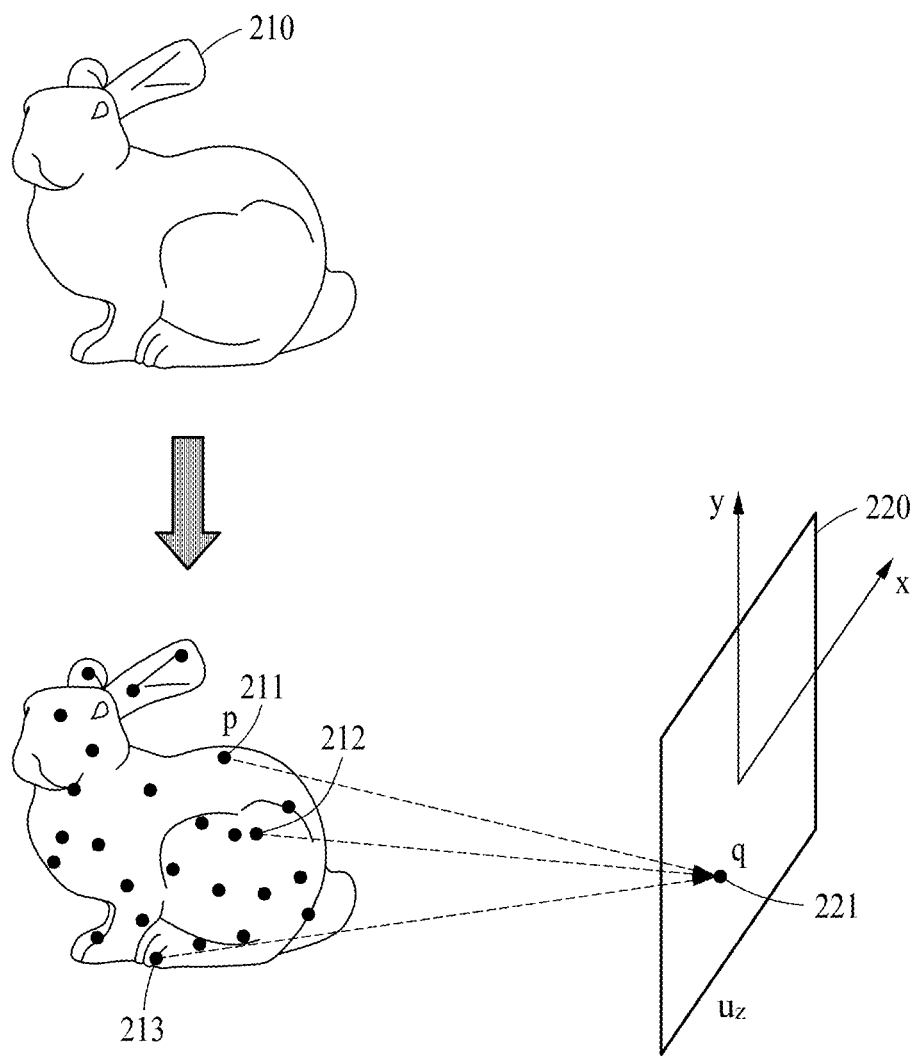
FIG. 2 is a diagram illustrating an example of projecting three-dimensional (3D) information to a two-dimensional (2D) complex field by an existing hologram generating apparatus according to related arts.

FIG. 2 is a diagram illustrating an example of projecting 3D information to a 2D complex field by an existing hologram generating apparatus according to related arts.

For example, input 3D information 210 of an object may be a polygonal 3D mesh for simulating a complex form of a real world as a set of simple line and surface information. The polygonal 3D mesh may represent a 2D surface by vertices and edges among the vertices.

In addition, texture may indicate additional information that defines a detailed color change of the surface of the polygonal 3D mesh and a distribution of surface directions, and be necessary information for generating a high-quality image.

A final hologram generated by the hologram generating apparatus 100 may be a set of complex numbers at lattice points defined on a 2D plane 220. A complex number at each of the lattice points may indicate an amplitude and phase value of light wave information transferred from the input 3D information 210.

A Rayleigh-Sommerfeld integral may reconstruct the input 3D information 210 to be a set of point light sources 211, 212, and 213 of infinitely small size, and add a light wave propagated from each of the point light sources 211, 212, and 213 to an output pixel 221. When the number of point light sources is not sufficient, the input 3D information 210 may represent a sparse point set including a great empty space that is different from an original form. To prevent such a sparse point set from being represented, a certain number or more of point light source samples may be required. In addition, an integral value may need to be calculated for each of all output pixels, a massive calculation amount may be required. In addition, the Rayleigh-Sommerfeld integral assumes that a point light source reaches an output plane without any restrictions. Thus, to generate a hologram with a wide viewing angle, an effect of blocking the point light source by the 3D mesh may need to be additionally calculated.

For example, an existing hologram generating apparatus may need to perform an intersection check to verify whether a virtual line connecting a point light source and an output pixel meets each polygon included in the 3D mesh, and thus a great calculation amount may be required for the intersection check.

Figure 3:
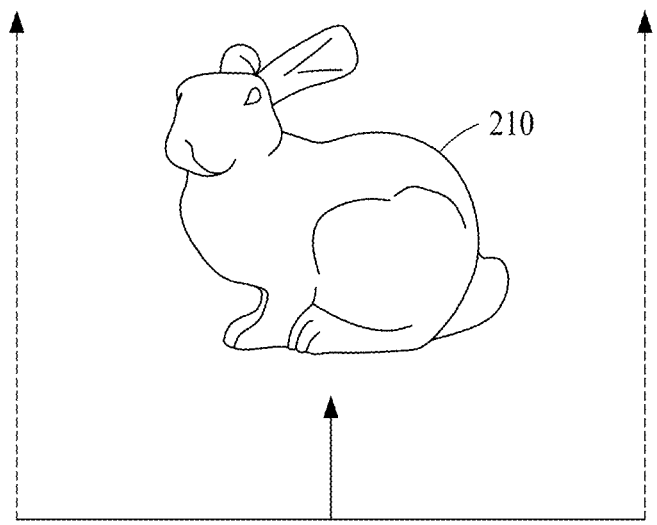
FIG. 3 is a diagram illustrating an example of generating an oblique projection image by a hologram generating apparatus according to an example embodiment.
Figure 3:
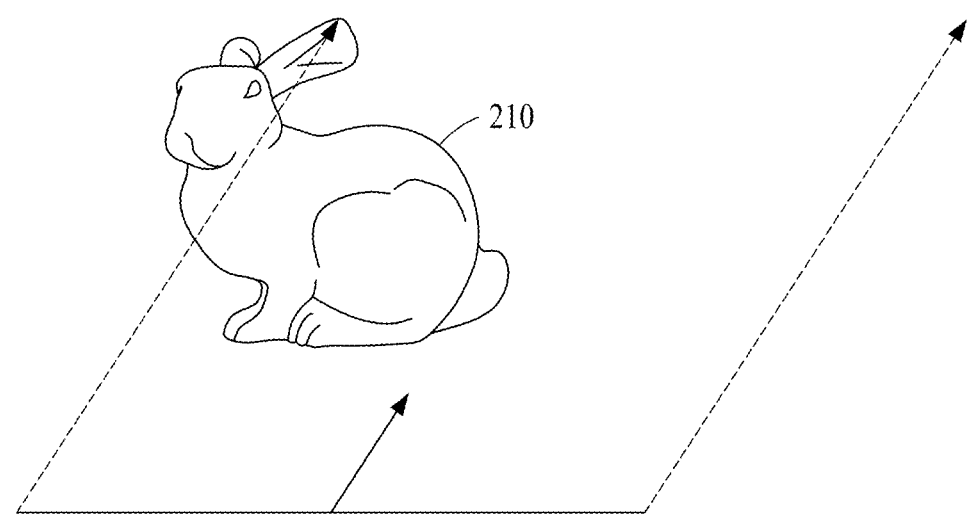

FIG. 3 illustrates an example of how the hologram generating apparatus 100 generates an oblique projection image by applying oblique projection based on viewing directions 310 and 320, when there is a 3D object (same as 210 in FIG. 2) and an output plane.

In the example, the oblique projection image to be generated by the hologram generating apparatus 100 may be generated through one-time render call, and thus it may be more effective compared to a direct Rayleigh-Sommerfeld integral by which calculations are performed on all point light source-output pixel pairs.

In addition, the hologram generating apparatus 100 may fast generate the oblique projection image for each viewing direction through scanline-based hardware rendering, and thus red, green, blue (RGB) colors and a depth value of 8 bit to 32 bit resolution may be obtained for each pixel.

From the depth value, it is possible to obtain a phase of a light wave, and thus the oblique projection image generated by the hologram generating apparatus 100 may be a elemental complex hologram toward a certain direction.

The hologram generating apparatus 100 may then generate a final hologram by superposing complex holograms in all directions.

Here, based on a range of angles, the number of complex holograms to be generated may increase excessively. Thus, the hologram generating apparatus 100 may store directions determined based on a tradeoff between a hologram quality and a calculation amount or the number of complex holograms. The human (naked) eye has an angular resolution of approximately 1 second (1/60 degrees (°)) based on a center of a retina. For example, under the assumption of a spatial light modulator having a pixel pitch of 8 micrometers (μm), a viewing angle may be approximately 2.36°, and 2.36°/1'=142. Thus, to generate a final hologram to be used in the spatial light modulator, approximately 142 complex holograms may be required for each axis direction.

In addition, in a CG rendering pipeline, projection may be represented by a 4×4 matrix product. For example, in the rendering pipeline, an orthogonal projection matrix for projecting 3D information of an object to a 2D complex field may be defined as represented by Equation 1 below.

$$P = \begin{bmatrix} \frac{2}{r-l} & 1 & 1 & 1 \\ 1 & \frac{2}{t-b} & 1 & 1 \\ 1 & 1 & \frac{1}{n-f} & 1 \\ \frac{l+r}{l-r} & \frac{t+b}{b-t} & \frac{f}{f-n} & 1 \end{bmatrix}$$ [Equation 1]

In Equation 1, r, l, t, b, n, and f denotes, respectively, right, left, top, bottom, near, and far parameters of a visible view frustum formed by each hologram.

In addition, the hologram generating apparatus 100 may use a shear matrix to represent the oblique projection. For example, in a case in which an angle of the oblique projection at which rendering desires to be performed corresponds to θ in an x-axis direction and Φ in a y-axis direction, the shear matrix may be defined as represented by Equation 2 below.

$$H = \begin{bmatrix} 1 & 1 & 1 & 1 \\ 1 & 1 & 1 & 1 \\ \tan(\theta) & \tan(\phi) & 1 & 1 \\ 1 & 1 & 1 & 1 \end{bmatrix}$$ [Equation 2]

An oblique projection matrix used by the hologram generating apparatus 100 to generate the oblique projection image may be H (shear matrix)*P (orthogonal projection matrix). That is, the hologram generating apparatus 100 may apply the oblique projection by replacing the projection matrix with the oblique projection matrix, and thus generate the oblique projection angle rapidly through the hardware rendering pipeline.

Figure 4:
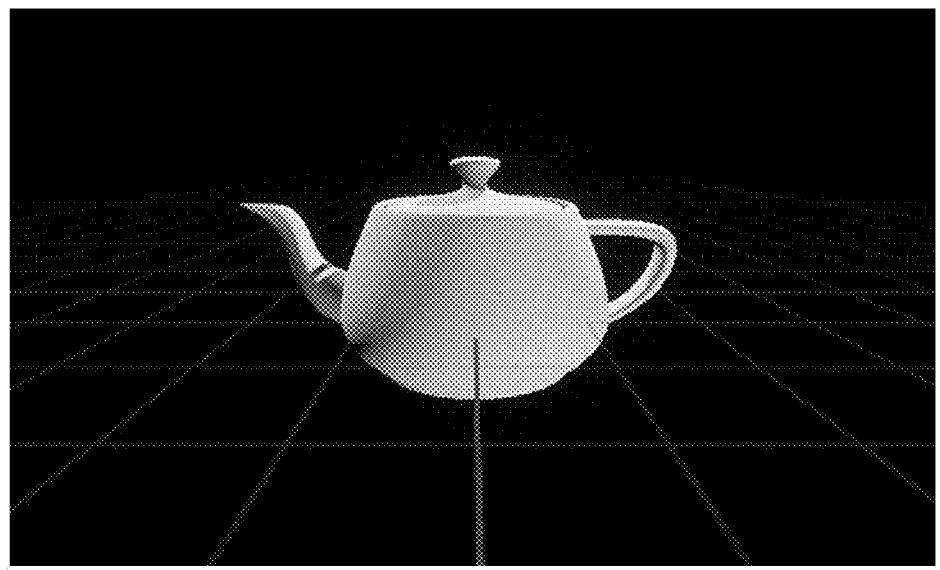
FIG. 4 is a diagram illustrating an example of 3D information input to a hologram generating apparatus according to an example embodiment.
Figure 5:
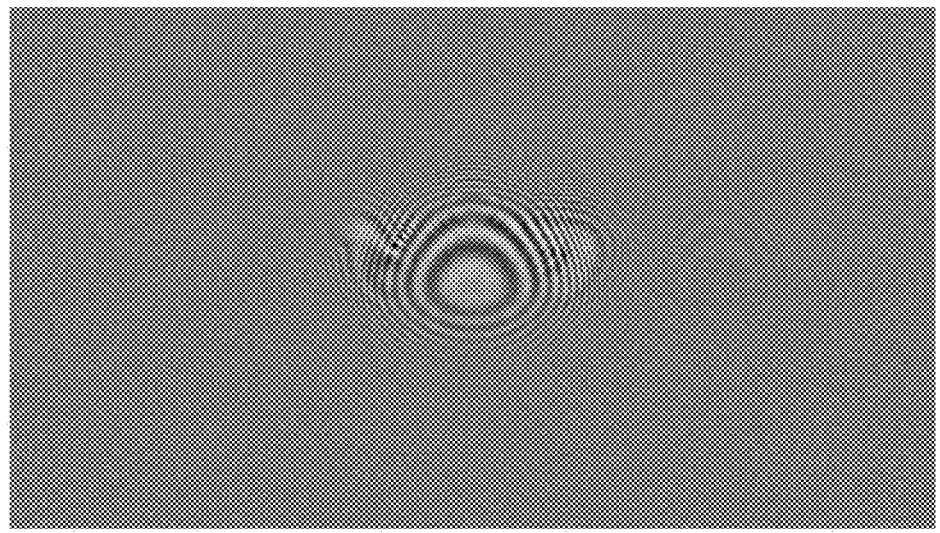
FIG. 5 is a diagram illustrating an example of a final hologram generated by a hologram generating apparatus using the 3D information of FIG. 4.
Figure 6:
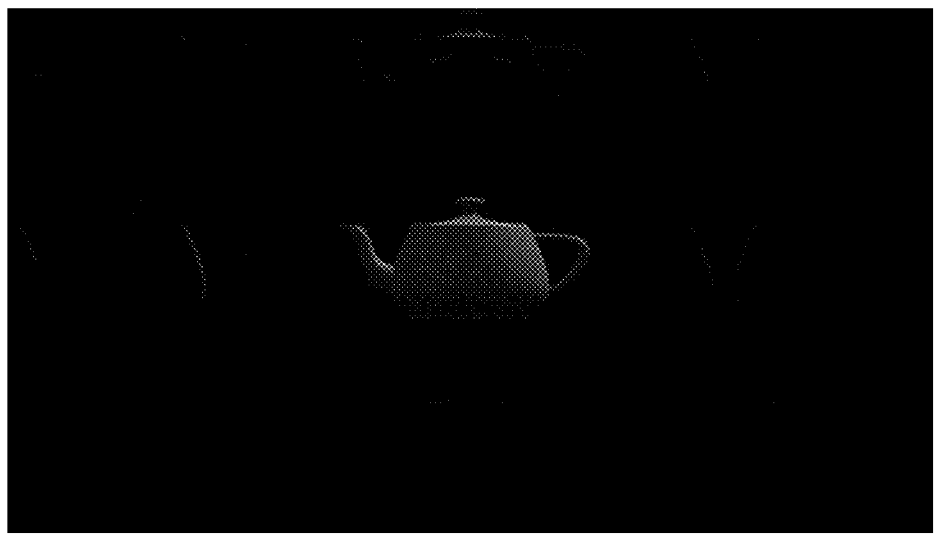
FIG. 6 is a diagram illustrating an example of a brightness image that is numerically restored from the final hologram of FIG. 5.

For example, in a case in which the hologram generating apparatus 100 receives, as an input, 3D information of a Utah teapot of which a material is defined as a Lambertian surface as illustrated in FIG. 4, the hologram generating apparatus 100 may overlap 490,000 oblique projection images to generate a final hologram as illustrated in FIG. 5. In addition, the final hologram of FIG. 5 may be restored to be a brightness image as illustrated in FIG. 6 through numerical restoration based on Fresnel propagation.

Figure 7:
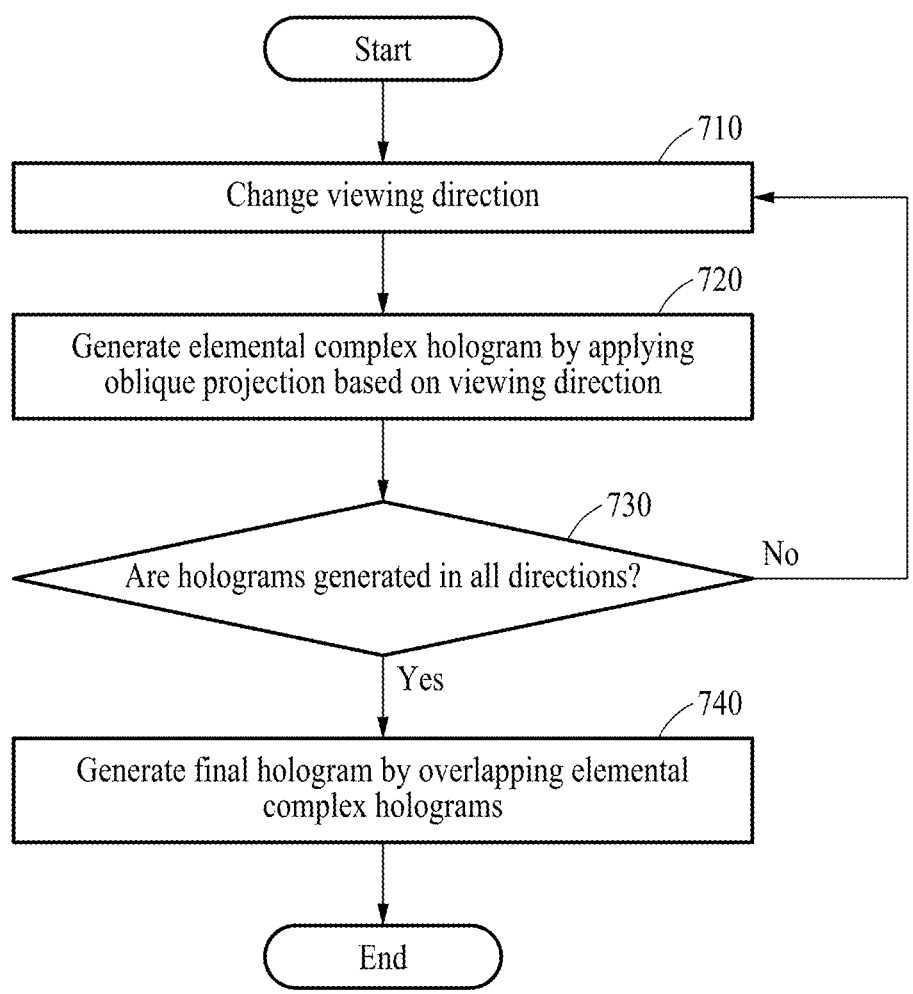
FIG. 7 is a flowchart illustrating an example of a hologram generating method according to an example embodiment.

FIG. 7 is a flowchart illustrating an example of a hologram generating method according to an example embodiment.

Referring to FIGS. 1 and 7, in operation 710, the viewing direction controller 110 changes a viewing direction 101 by transferring, to the viewing direction 101 or a control device configured to control the viewing direction 101, a control signal for changing a viewing direction 101. For example, when the hologram generating apparatus 100 operates, the viewing direction controller 110 may verify whether a viewing direction 101 is the same direction as a default or initial direction. When the viewing direction 101 is different from the default or initial direction, the viewing direction controller 110 may change the viewing direction 101 to be the same as the default or initial direction.

In operation 720, the elemental hologram generator 120 generates a elemental complex hologram by applying oblique projection to 3D information of an object based on the viewing direction 101 that is changed in operation 710. For example, the elemental hologram generator 120 may determine an oblique projection matrix using an orthogonal projection matrix and a shear matrix to project the 3D information of the object to a 2D complex field in a rendering pipeline, and generate the elemental complex hologram by applying the determined oblique projection matrix to the 3D information of the object.

In operation 730, the elemental hologram generator 120 verifies whether the elemental complex hologram is generated for each of all directions. For example, when the number of elemental complex holograms generated by repeatedly performing operation 720 is greater than or equal to a preset number, the elemental hologram generator 120 may determine that the elemental complex hologram is generated for all the directions. However, when the number of elemental complex holograms generated by repeatedly performing operation 720 is less than the preset number, the elemental hologram generator 120 may determine that not all elemental complex holograms are generated for all the directions.

In addition, a viewing direction 101 for which a elemental complex hologram needs to be generated may be set in advance. In such a case, when all elemental complex holograms are generated for all preset directions, the elemental hologram generator 120 may determine that the elemental complex holograms are all generated for all the preset directions. However, when there is a direction for which a elemental complex hologram is not generated among the preset directions, the elemental hologram generator 120 may determine that not all the elemental complex holograms are generated for all the preset directions.

When not all the elemental complex holograms are generated for all the directions, the elemental hologram generator 120 may request the viewing direction controller 110 to change the viewing direction 101. In response to the request, the viewing direction controller 110 may generate a control signal for changing the viewing direction 101, and change the viewing direction 101. The viewing direction controller 110 may change the viewing direction 101 to the direction for which the elemental complex hologram is not generated. The elemental hologram generator 120 may then repeatedly perform such an operation of generating a elemental hologram corresponding to each of different viewing directions 101 until the elemental complex holograms are all generated for all the directions.

When all the elemental complex holograms are generated for all the directions, the elemental hologram generator 120 may transfer the elemental complex holograms generated in operation 720 to the final hologram generator 130 to allow the final hologram generator 130 to perform operation 740.

In operation 740, the final hologram generator 130 generates a final hologram by superposing the elemental complex holograms generated in operation 720 based on different viewing directions 101.

The hologram generating apparatus or the hologram generating method described herein may be written in a program that is executable in a computer, and implemented by various recording media, such as, for example, a magnetic storage medium, an optical reading medium, a digital storage medium, and the like.

According to an example embodiment, it is possible to generate a digital hologram with a wide viewing angle that supports occlusion and direction-dependent shading, by generating a plurality of elemental complex holograms by applying oblique projection in different directions and then generating a final hologram by superposing the generated elemental complex holograms.

According to an example embodiment, it is possible to produce various holographic contents rapidly and readily through a combination of a CG rendering pipeline and a fast hologram calculation, by generating a plurality of elemental complex holograms by applying oblique projection in different directions using a rendering pipeline.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A hologram generating method, comprising:
    generating an elemental complex hologram by applying oblique projection to three-dimensional (3D) information of an object based on a viewing direction; and
    generating a final hologram by superposing a plurality of elemental complex holograms generated based on different viewing directions,
    wherein the generation of the elemental complex hologram comprises determining an oblique projection matrix using an orthogonal projection matrix and a shear matrix to project the 3D information of the object to a two-dimensional (2D) complex field in a rendering pipeline.

2. The hologram generating method of claim 1, wherein, when the number of the elemental complex holograms is less than a preset number, further comprising:
    changing the viewing direction,
    wherein the generation of the elemental complex hologram is performed repeatedly until the number of the elemental complex holograms is greater than or equal to the preset number.

3. The hologram generating method of claim 1, wherein, when there is a direction for which an elemental complex hologram is not generated among preset directions, further comprising:
    changing the viewing direction to the direction for which the elemental complex hologram is not generated,
    wherein the generation of the elemental complex hologram is performed repeatedly until the elemental complex hologram is generated for all the preset directions.

4. The hologram generating method of claim 1, wherein the elemental complex hologram is fast generated by scan-line-based hardware rendering.

5. The hologram generating method of claim 1, wherein the generation of the elemental complex hologram further comprises:
    generating the elemental complex hologram by applying the determined oblique projection matrix to the 3D information of the object.

6. A non-transitory computer-readable storage medium storing instructions that, when executed by a processor, cause the processor to perform the hologram generating method of claim 1.

7. A hologram generating apparatus, comprising:
    an elemental hologram generator configured to generate an elemental complex hologram by applying oblique projection to three-dimensional (3D) information of an object based on a viewing direction; and
    a final hologram generator configured to generate a final hologram by superposing a plurality of elemental complex holograms generated based on different viewing directions, wherein the elemental hologram generator is configured to determine an oblique projection matrix using an orthogonal projection matrix and a shear matrix to project the 3D information of the object to a two-dimensional (2D) complex field in a rendering pipeline.

8. The hologram generating apparatus of claim 7, wherein, when the number of the elemental complex holograms is less than a preset number, further comprising:

a viewing direction controller configured to change the viewing direction, wherein the elemental hologram generator is configured to perform repeatedly the generation of an elemental complex hologram corresponding to each of the different viewing directions until the number of the elemental complex holograms is greater than or equal to the preset number.

9. The hologram generating apparatus of claim 7, wherein, when there is a direction for which an elemental complex hologram is not generated among preset directions, further comprising:

a viewing direction controller configured to change the viewing direction to the direction for which the elemental complex hologram is not generated, wherein the elemental hologram generator is configured to perform repeatedly the generation of an elemental complex hologram corresponding to each of the different viewing directions until the elemental complex hologram is generated for all the preset directions.

10. The hologram generating apparatus of claim 7, wherein the elemental complex hologram is fast generated by scanline-based hardware rendering.

11. The hologram generating apparatus of claim 7, wherein the elemental hologram generator is further configured to:

generate the elemental complex hologram by applying the determined oblique projection matrix to the 3D information of the object.

* * * * *